(12) United States Patent
Wu et al.

(10) Patent No.: US 12,126,268 B2
(45) Date of Patent: Oct. 22, 2024

(54) SYNCHRONOUS RECTIFIERS AND CHARGING METHODS USED THEREIN

(71) Applicant: Leadtrend Technology Corporation, Zhubei (TW)

(72) Inventors: Tsung-Chien Wu, Zhubei (TW); Chung-Wei Lin, Zhubei (TW); Chun-Hsin Li, Zhubei (TW); Jun-Hao Huang, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 408 days.

(21) Appl. No.: 17/724,104

(22) Filed: Apr. 19, 2022

(65) Prior Publication Data
US 2023/0015445 A1    Jan. 19, 2023

(30) Foreign Application Priority Data

Jul. 19, 2021   (TW) .................................. 110126464

(51) Int. Cl.
*H02M 3/335*    (2006.01)
*H02M 1/00*    (2007.01)
*H02M 1/08*    (2006.01)

(52) U.S. Cl.
CPC ..... *H02M 3/33592* (2013.01); *H02M 1/0006* (2021.05); *H02M 1/08* (2013.01)

(58) Field of Classification Search
CPC ............. H02M 1/0003; H02M 1/0006; H02M 1/0058; H02M 1/08; H02M 3/335; H02M 3/33507; H02M 3/33561; H02M 3/33569; H02M 3/33592; H02M 1/4241; H02M 3/01

See application file for complete search history.

(56) References Cited

U.S. PATENT DOCUMENTS

| 2018/0062530 | A1* | 3/2018 | Kong | ....................... H02M 1/08 |
| 2018/0212527 | A1* | 7/2018 | Kong | ................ H02M 3/33592 |
| 2019/0115844 | A1* | 4/2019 | Tang | ................. H02M 3/33592 |
| 2020/0036293 | A1* | 1/2020 | Kannan | ............. H02M 3/33523 |
| 2021/0242783 | A1* | 8/2021 | Xu | ..................... H02M 3/33538 |
| 2021/0242793 | A1* | 8/2021 | Yin | ................... H02M 3/33592 |
| 2021/0384842 | A1* | 12/2021 | Yeh | ..................... H02M 1/0048 |
| 2023/0016802 | A1* | 1/2023 | Feng | ................. H02M 3/33592 |

* cited by examiner

*Primary Examiner* — Thienvu V Tran
*Assistant Examiner* — Shahzeb K Ahmad
(74) *Attorney, Agent, or Firm* — McClure, Qualey & Rodack, LLP

(57) ABSTRACT

An operation power source for an operation power source supplying power to a synchronous rectifier controller is charged according to the invention. The synchronous rectifier controller controls a synchronous rectifier in response to a channel signal of the synchronous rectifier, generating SR ON times and SR OFF times. It is determined whether the channel signal resonates in a first SR OFF time, to provide an oscillation record accordingly. In a second SR OFF time after the first SR OFF time, in response to the oscillation record, a portion of resonance energy that causes the channel signal resonating is directed to charge the operation power source.

10 Claims, 6 Drawing Sheets

SYNCHRONOUS RECTIFIERS AND CHARGING METHODS USED THEREIN

CROSS-REFERENCE TO RELATED APPLICATION

This application claims priority to and the benefit of Taiwan Application Series Number 110126464 filed on Jul. 19, 2021, which is incorporated by reference in its entirety.

BACKGROUND

The present disclosure relates generally to a power supply with synchronous rectification, and more particularly, to methods and apparatuses used for charging the operation power source supplying power to a synchronous rectifier controller.

Synchronous rectification (SR) is a very popular skill in the field of power management. It may use a synchronous rectifier and an SR controller in combination, to imitate and replace a diode that conducts very large current. The diode, because of its forward voltage, consumes considerable electric power when conducting large current. Nevertheless, the synchronous rectifier could save a lot of electric power if its ON-resistance is designed to be little enough.

FIG. 1 demonstrates an alternating-current to direct-current (AC-to-DC) power supply 10, which has primary winding LP and secondary winding LS located in a primary side and a secondary side respectively, where galvanic isolation is provided between the primary and secondary sides.

In the primary side, bridge rectifier 12 provides full-waveform rectification to an AC mains power source, and generates input power source $V_{IN}$ and input ground at input power line IN and input ground line 26 respectively. Power controller 13 generates PWM (pulse width modulation) signal $S_{PRI}$ to control the duty cycle of power switch N1, altering the current through primary winding LP and the voltage across primary winding LP.

In the secondary side, secondary winding LS generates induced voltage and current in response to the change of the voltage and current of primary winding LP. SR controller 14 detects channel signal $V_D$ of synchronous rectifier SWSR via the help of detection node DET and detection resistor RC, to generate synchronous signal $S_{SEC}$ controlling synchronous rectifier SWSR. SR controller 14 in general keeps secondary-side current $I_{SEC}$ positive, to charge output capacitor 17 and to build up output voltage source $V_{OUT}$ supplying power to load 16. In the secondary side, the operation power that SR controller 14 needs for its operation is generally provided by operation power source $V_{CC}$ stored on capacitor 30.

Each of FIGS. 2A and 2B demonstrates waveforms of PWM signal $S_{PR}$ and channel signal $V_D$. Nevertheless, AC-to-DC power supply 10 operates in DCM (discontinuous-conduction mode) in FIG. 2A and in CCM (continuous-conduction mode) in FIG. 2B. In FIG. 2A, demagnetization time $T_{DMG}$ is a period of time when channel signal $V_D$ becomes negative after PWM signal $S_{PRI}$ turns OFF power switch N1 in FIG. 1. During demagnetization time $T_{DMG}$, channel signal $V_D$ is very negative in the beginning and gradually approaches 0V as secondary-side current $I_{SEC}$ subsides to 0 A. Therefore, the operation mode in FIG. 2A is called DCM. After demagnetization time $T_{DMG}$, a LC-resonance tank formed by transformer TF and a parasitic capacitor starts free resonance, so channel signal $V_D$ keeps oscillating, until a next ON time $T_{ON-P}$ when power switch N1 is turned ON. FIG. 2B, unlike FIG. 2A, shows that ON time $T_{ON-P}$ starts when channel signal $V_D$ is still negative or before secondary-side current $I_{SEC}$ subsides to 0 A, so the operation mode in FIG. 2B is called CCM.

It is denoted in FIGS. 2A and 2B that operation power source $V_{CC}$ is higher than output voltage source $V_{OUT}$. In other words, output voltage source $V_{OUT}$ cannot be used to charge capacitor 30 directly. Somehow operation power source $V_{CC}$ need to be charged from time to time, or its power might deplete as SR controller 14 keeps operating.

One way to charge capacitor 30 in FIG. 1 is providing an LDO (low dropout) inside SR controller 14 and turning it ON during ON time $T_{ON-P}$ to direct current from high-voltage node HVR, the current charging capacitor 30 to hold operation power source $V_{CC}$ above a certain level. It is also shown in FIGS. 2A and 2B however, that during ON time $T_{ON-P}$ channel signal $V_D$, the voltage at high-voltage node HVR, is much higher than operation power source $V_{CC}$. Expectedly, the LDO, due to the high voltage difference between channel signal $V_D$ and operation power source $V_{CC}$, will consume a lot of electric power when charging capacitor 30, and the result will reduce the overall power conversion efficiency of AC-to-DC power supply 10 significantly, especially when load 16 is light or absent.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
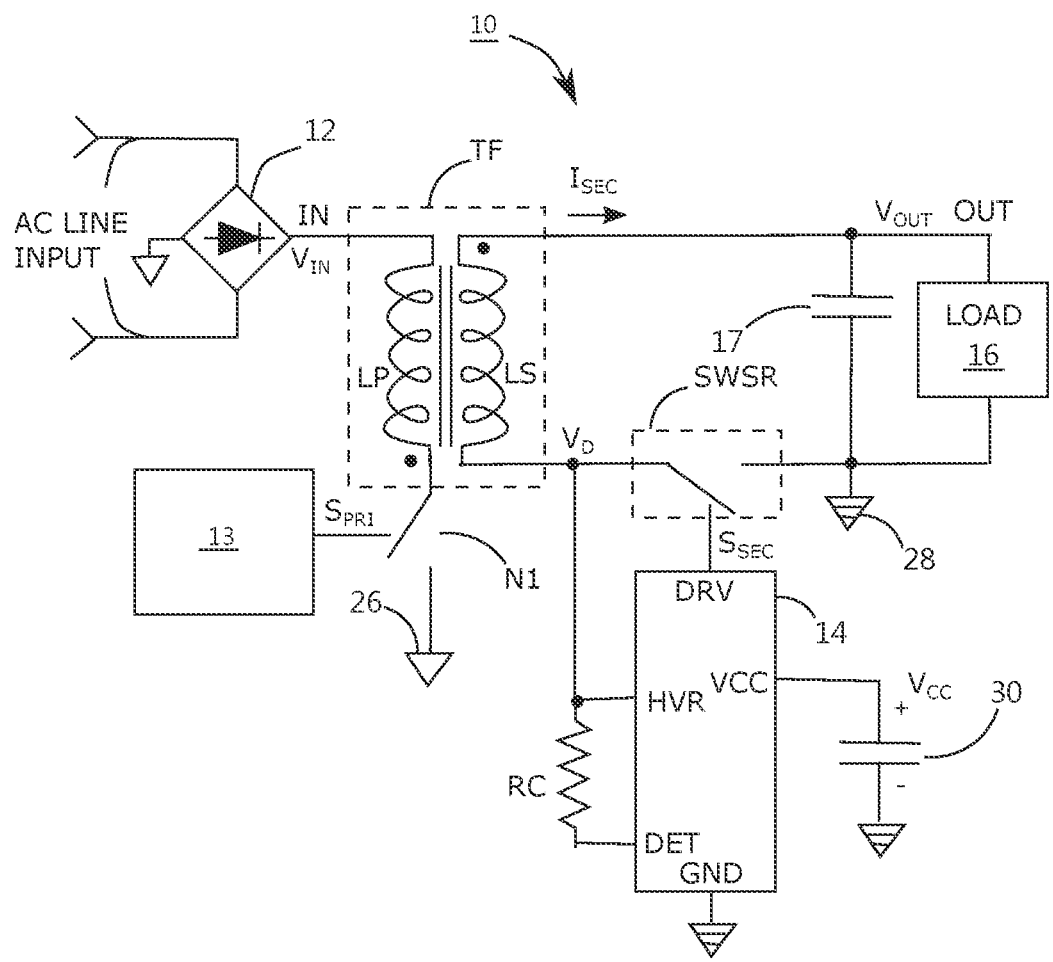
FIG. 1 demonstrates an AC-to-DC power supply.
Figure 2A:
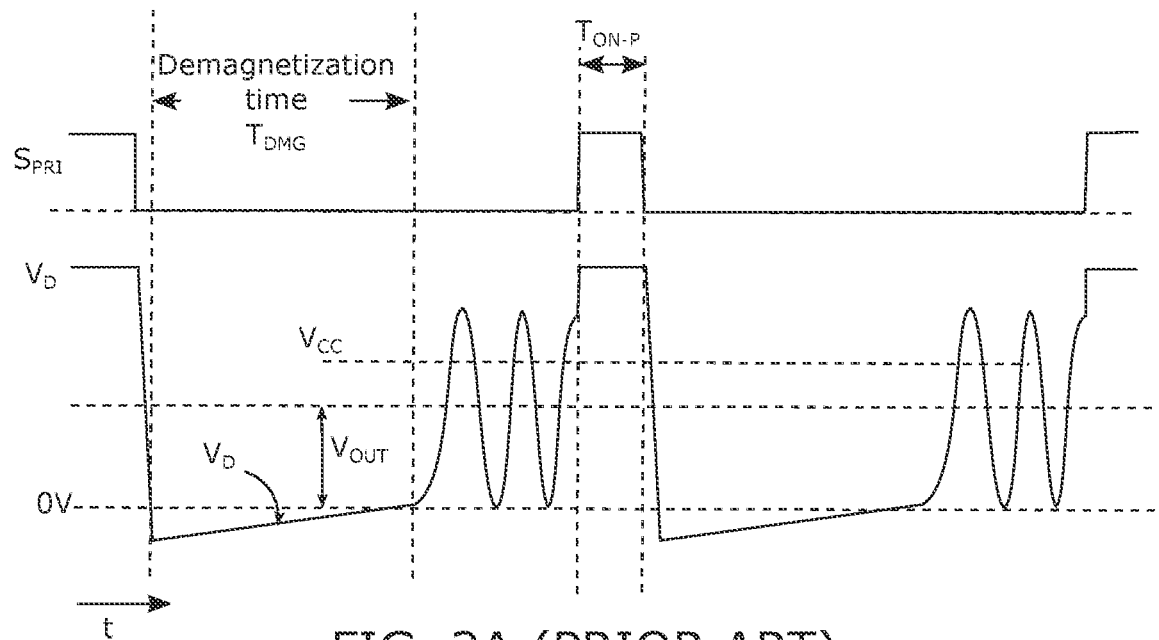
FIGS. 2A and 2B demonstrate waveforms of PWM signal $S_{PRI}$ and channel signal $V_D$, FIGS. 2A and 2B operating in DCM and CCM respectively.
Figure 2B:
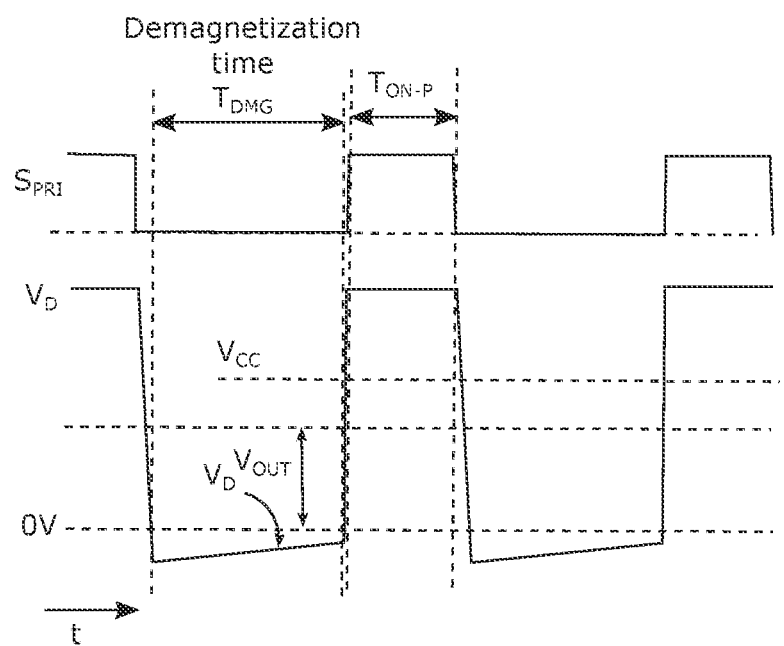

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

An embodiment of the invention is suitable for charging the operation power source of a SR controller in a power supply. The SR controller controls a synchronous rectifier in response to a channel signal of the synchronous rectifier, to generate several SR ON times and SR OFF times. The channel signal is detected to determine whether the channel signal resonates within a first SR OFF time, and an oscillation record is provided in response. In response to the oscillation record, a portion of the energy that causes the channel signal to resonate is directed to charge the operation power source within a second SR OFF time after the first SR OFF time.

In some embodiments, it is determined whether the power supply is operating in discontinuous mode (DCM) to determine whether the channel signal resonates. If the power supply operates in DCM, a portion of the energy is directed to charge the operation power source in a time period when the channel signal is at about a peak.

An embodiment of the invention provides a SR controller capable of being supplied power by an operation power source. The SR controller controls a synchronous rectifier, and includes a switch controller, a charging switch, a resonance detector, and a charging controller. The switch controller turns ON and OFF the synchronous rectifier in response to a channel signal of the synchronous rectifier, and therefore generates SR ON times and SR OFF times. The charging switch provides a charging path when turned ON. The resonance detector detects whether the channel signal resonates within a first SR OFF time to provide an oscillation record. In response to the oscillation record, the charging controller turns ON the charging switch in a second SR OFF time after the first SR OFF time, so that a portion of energy that causes the channel signal resonating is directed to charge the operation power source through the charging path.

According to an embodiment of the invention, the resonance detector determines whether the power supply is operating in DCM to determine whether the channel signal resonates. If the power supply operates in DCM, a portion of the energy is directed to charge the operation power source in a time period when the channel signal is at about a peak.

Figure 3:
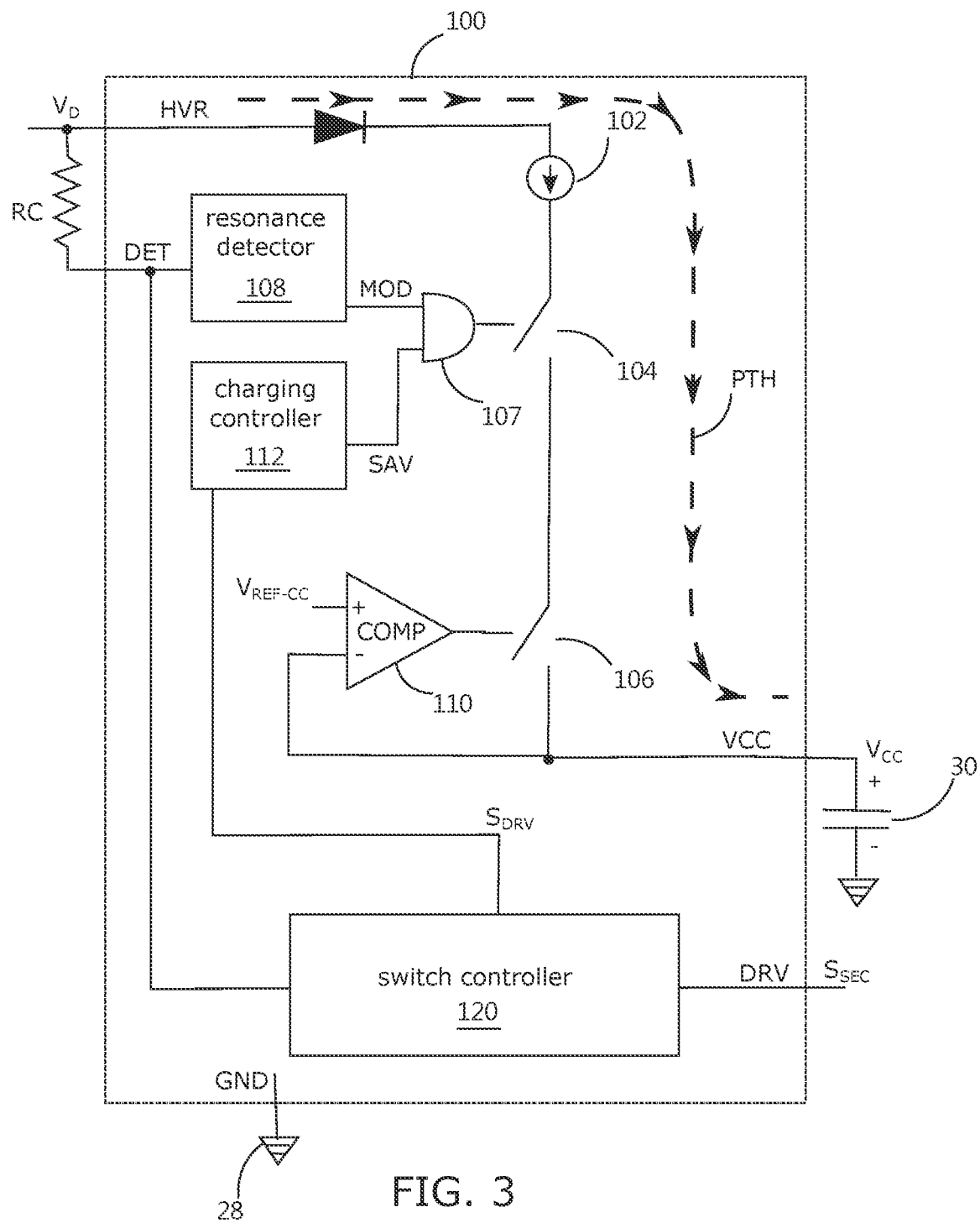
FIG. 3 demonstrates a SR controller according to embodiments of the invention.
Figure 4:
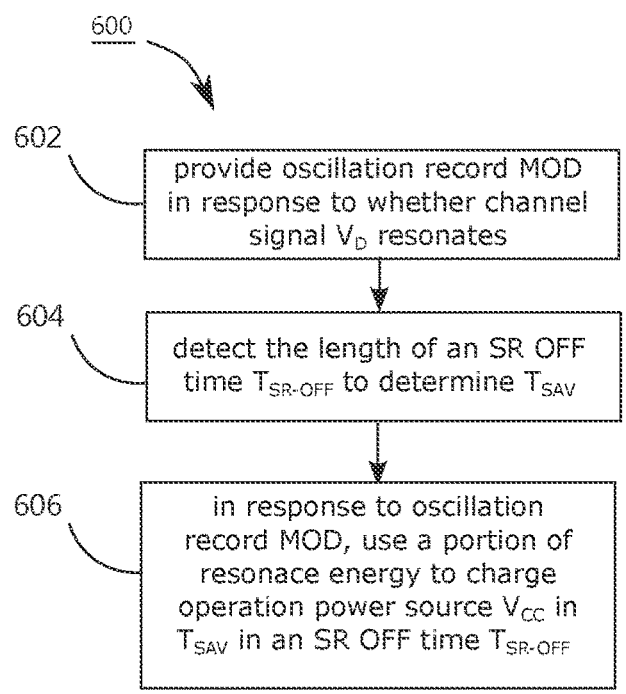
FIG. 4 demonstrates a control method in use of the SR controller in FIG. 3.
Figure 5:
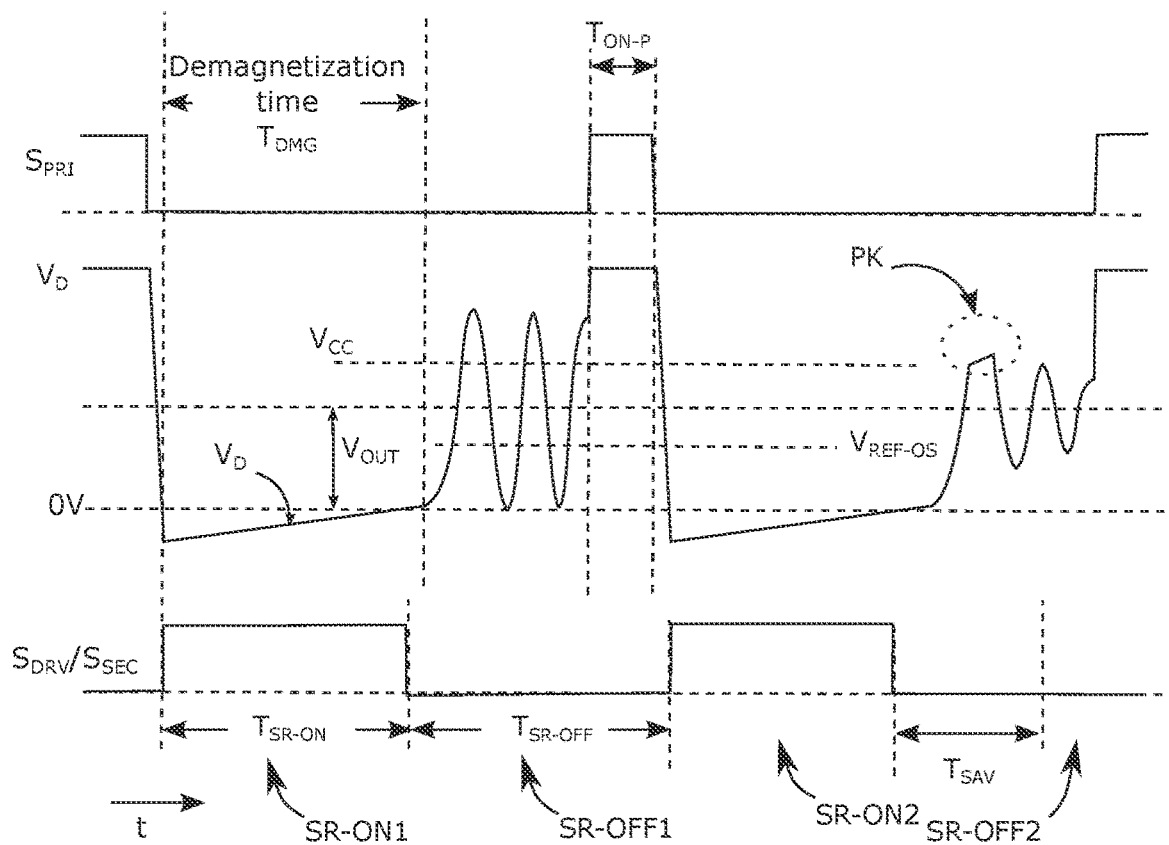
FIG. 5 shows some waveforms of signals in FIG. 1 when the SR controller in FIG. 3 is used in FIG. 1.

FIG. 3 demonstrates SR controller 100 according to embodiments of the invention, and can replace SR controller 14 in FIG. 1 according to some embodiments of the invention. FIG. 4 demonstrates control method 600 in use of SR controller 100. FIG. 5 shows some waveforms of signals in FIG. 1 when SR controller 100 replaces SR controller 14.

As shown in FIG. 3, SR controller 100 has switch controller 120, resonance detector 108, charging switches 104 and 106, charging controller 112, and comparator 110.

Switch controller 120 detects channel signal $V_D$ of synchronous rectifier SWSR to generate synchronous signal $S_{SEC}$ controlling synchronous rectifier SWSR. For example, if channel signal $V_D$ is positive, larger than the output ground at output ground line 28, switch controller 120 turns synchronous signals $S_{SEC}$ and $S_{DRV}$ "0" in logic, to turn OFF synchronous rectifier SWSR. On the other hand, if channel signal $V_D$ is determined to be negative in comparison with the output ground at output ground line 28, synchronous signals $S_{SEC}$ and $S_{DRV}$ become "1" in logic to turn ON synchronous rectifier SWSR. An SR ON time $T_{SR-ON}$ refers to as a period of time when synchronous rectifier SWSR is turned ON, providing a conduction channel with very little resistance to connect ground line 28 with the node at which channel signal $V_D$ is. An SR OFF time $T_{SR-OFF}$ refers to as another period of time when synchronous rectifier SWSR is turned OFF, meaning that the conduction channel with very little resistance is no more provided. During an SR OFF time $T_{SR-OFF}$, channel signal $V_D$ could be independent from ground line 28, but may be still somehow clamped by ground line 28 due to for example a body diode in synchronous rectifier SWSR. Synchronous signals $S_{SEC}$ and $S_{DRV}$ are equivalent in view of logic. The current or the voltage of synchronous signal $S_{SEC}$ may vary for the same logic, to appropriately drive synchronous rectifier SWSR. As to synchronous signal $S_{DRV}$, which is used internally inside the SR controller 100, its voltage or current might be constant or fixed for the same logic. As shown in FIG. 5, as PWM signal $S_{PRI}$ causes the change of the voltage/current of primary winding LP, switch controller 120 generates synchronous signal $S_{SEC}$ in response to channel signal $V_D$ to turn ON or OFF synchronous rectifier SWSR, and, consequentially, generates SR ON times SR-ON1, SR-ON2, and SR OFF times SR-OFF1, SR-OFF2. SR ON times alternate with SR OFF times, meaning that an SR ON time $T_{SR-ON}$ follows an SR OFF time $T_{SR-OFF}$ that follows another SR ON time $T_{SR-ON}$.

Resonance detector 108 in FIG. 3 is configured to perform step 602 in FIG. 4, determining whether channel signal $V_D$ resonates within an SR OFF time $T_{SR-OFF}$ and providing oscillation record MOD accordingly. Resonance detector 108 will be detailed later. It is shown in FIG. 5 that channel signal $V_D$ obviously resonates within SR OFF time SR-OFF1. Therefore, when SR OFF time SR-OFF1 ends, resonance detector 108 makes oscillation record MOD "1" in logic accordingly. In the case that channel signal $V_D$ does not resonate within an SR OFF time $T_{SR-OFF}$, oscillation record MOD will be "0" at the end of the SR OFF time $T_{SR-OFF}$.

Charging switches 104 and 106 in FIG. 3 are connected in series. When they both are turned ON, charging path PTH is constructed, and the charge at high-voltage node HVR can go through charging path PTH, via constant current circuit 102 and charging switches 104 and 106, to charge operation power source $V_{CC}$ connected at power node VCC.

Charging controller 112 in FIG. 3 is configured to implement step 604 in FIG. 4, detecting and recording the length of an SR OFF time $T_{SR-OFF}$, and accordingly determining safe period $T_{SAV}$ in the next SR OFF time $T_{SR-OFF}$. Charging controller 112 will be detailed later. Shown in FIG. 5, safe period $T_{SAV}$ within SR OFF time SR-OFF2 starts substantially at the beginning of SR OFF time SR-OFF2, and the length of the safe period $T_{SAV}$ is determined based on the length of SR OFF time SR-OFF1. For example, the length of safe period $T_{SAV}$ in FIG. 5 is about half the length of SR OFF time SR-OFF1.

Resonance detector 108, charging controller 112, and AND gate 107 in FIG. 3 are configured to implement step 606 in FIG. 4. In case that oscillation record MOD is "1" in logic, charging controller 112 turns ON charging switch 104 during safe period $T_{SAV}$, so a portion of the resonance energy that causes channel signal $V_D$ resonating can go through charging path PTH to charge operation power source $V_{CC}$, and this charging process continues until operation power source $V_{CC}$ reaches reference voltage $V_{REF-CC}$ to turn OFF charging switch 106. As shown in FIG. 5, because channel signal $V_D$ resonates in SR OFF time SR-OFF1, so a portion of the resonance energy that causes channel signal $V_D$ resonating in SR OFF time SR-OFF2 is utilized to charge operation power source $V_{CC}$ during safe period $T_{SAV}$. Area PK in FIG. 5 shows that a peak that should occur due to the resonance of channel signal $V_D$ is trimmed because some of the resonance energy starts charging operation power source $V_{CC}$ as the voltage level of channel signal $V_D$ at that time exceeds operation power source $V_{CC}$. FIG. 5 also demonstrates that the amplitude of the resonance during SR OFF time SR-OFF2 is less than that of the resonance during SR OFF time SR-OFF1, because a portion of the resonance during SR OFF time SR-OFF2 is directed to charge operation power source $V_{CC}$ at the period around area PK in FIG. 5.

Figure 6:
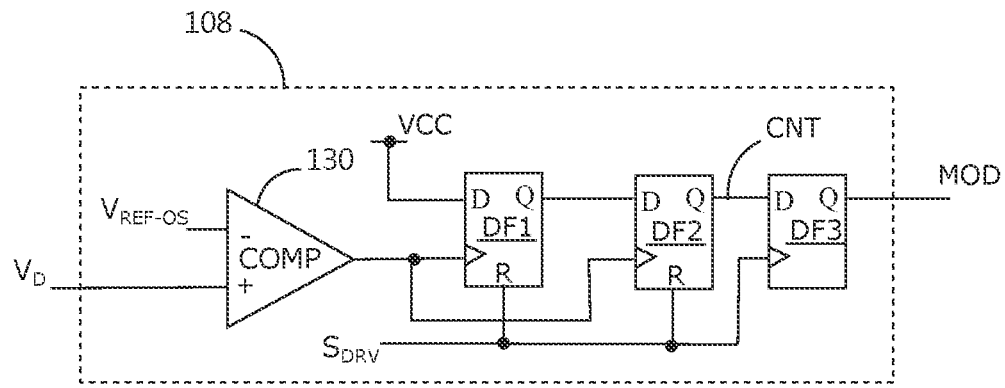
FIG. 6 demonstrates a resonance detector.
Figure 7:
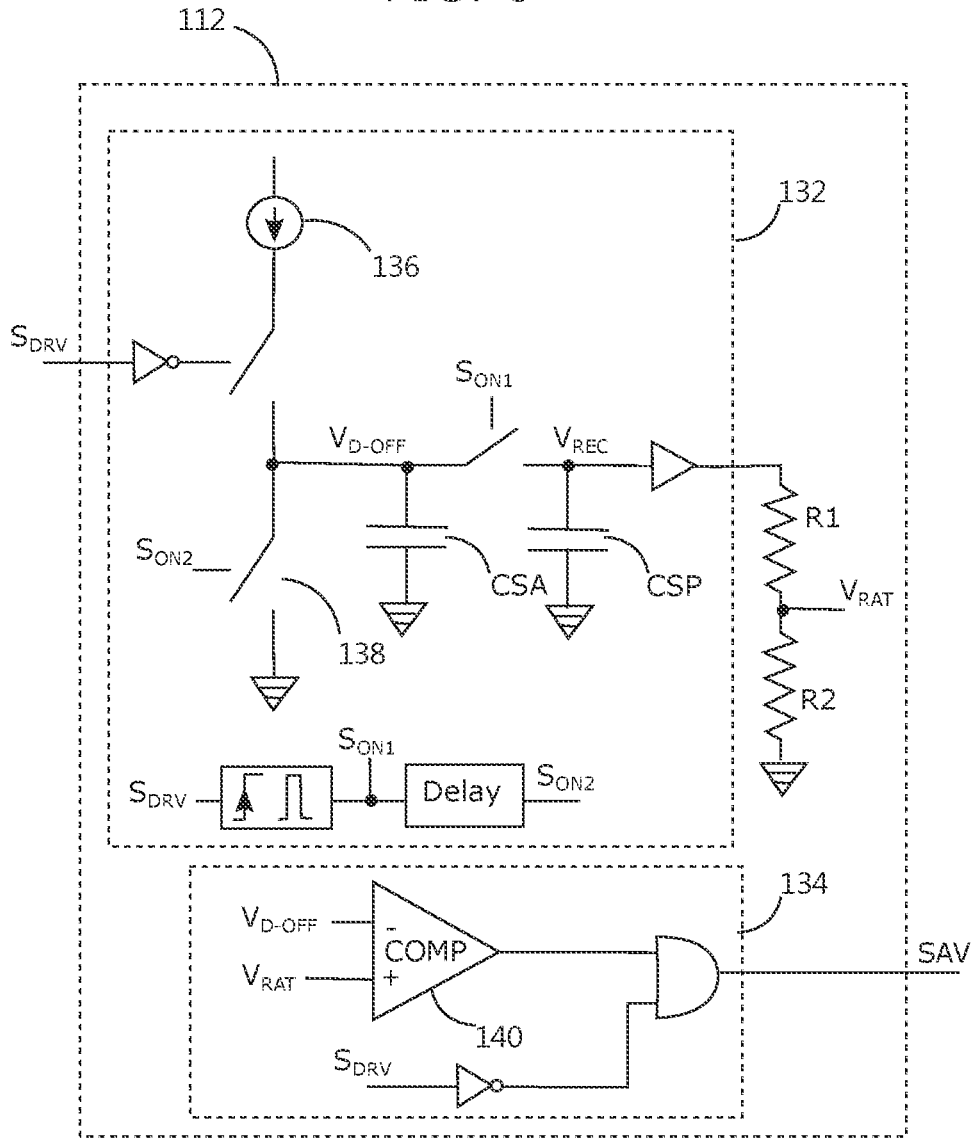
FIG. 7 shows a charging controller.
Figure 8:
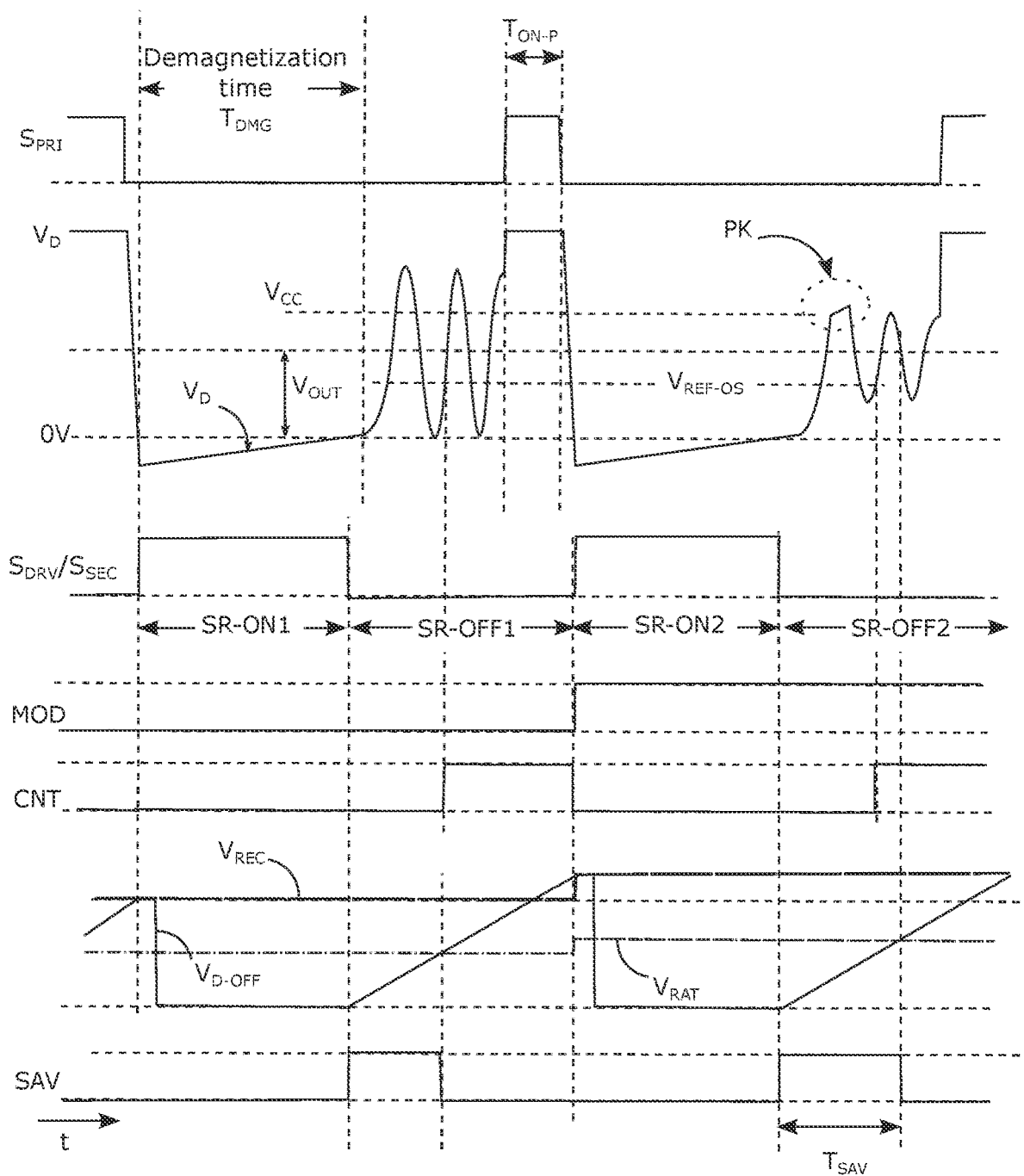
FIG. 8 shows waveforms of signals in FIGS. 5, 6 and 7.

FIG. 6 demonstrates resonance detector 108, including comparator 130, and D flip-flops DF1, DF2, and DF3, connection of which is shown in FIG. 6. FIG. 7 shows charging controller 112. FIG. 8 is substantially like FIG. 5, but additionally shows waveforms of oscillation record MOD, signal CNT, voltage $V_{D-OFF}$, $V_{REC}$, and $V_{RAT}$, and signal SAV, all of which can be found in FIGS. 6 and 7.

FIG. 6 is just an example of the invention, but is not intended to limit the scope of the invention. A resonance detector according to embodiments of the invention might be different from the one in FIG. 6, but still be capable of detecting whether channel signal $V_D$ resonates within an SR OFF time $T_{SR-OFF}$. Please refer to both FIGS. 6 and 8. Simply speaking, resonance detector 108 in FIG. 6 detects whether channel signal $V_D$ rises across reference voltage $V_{RES-OS}$ twice within an SR OFF time $T_{SR-OFF}$ D flip-flops DF1 and DF2, connected as a shift register, makes signal CNT "1" in logic only when comparator 130 has output two rising edges as shown in FIG. 8. When synchronous signal $S_{SEC}/S_{DRV}$ turns "1" from "0", D flip-flop DF3 duplicates signal CNT to generate oscillation record MOD, and each of D flip-flops DF1 and DF2 is reset to make its output "0". The condition that channel signal $V_D$ rises across reference voltage $V_{RES-OS}$ twice within an SR OFF time $T_{SR-OFF}$ surely indicates that channel signal $V_D$ resonated and that power supply 10 operated in DCM within the last switching cycle. Nevertheless, power supply 10 is operating in DCM or CCM (continuous conduction mode) if channel signal $V_D$ rises across reference voltage $V_{RES-OS}$ less than twice within an SR OFF time $T_{SR-OFF}$. Therefore, if oscillation record MOD in FIG. 6 is "1" in logic, it is assured that, during the last SR OFF time $T_{SR-OFF}$, power supply 10 was operating in DCM and channel signal $V_D$ resonated.

FIG. 7 shows charging controller 112, which is an example only and is not intended to limit the scope of the invention. A circuitry different from that in FIG. 7 might be used in embodiments of the invention to determine safe period $T_{SAV}$ within an SR OFF time $T_{SR-OFF}$ Charging controller 112 in FIG. 7 has time recorder 132, selector 134, and voltage-dividing resistors R1 and R2.

Please refer to FIGS. 7 and 8. At the beginning of an SR OFF time $T_{SR-OFF}$, voltage $V_{D-OFF}$ on capacitor CSA is about 0V. As an SR OFF time $T_{SR-OFF}$ goes on, constant current 136 charges capacitor CSA to linearly increase voltage $V_{D-OFF}$ over time, so the magnitude of voltage $V_{D-OFF}$ can substantially represent the length of the present SR OFF time $T_{SR-OFF}$. When the present SR OFF time $T_{SR-OFF}$ ends, short pulse $S_{ON1}$ makes sampling capacitor CSP sample voltage $V_{D-OFF}$ to generate voltage $V_{REC}$, and then short pulse $S_{ON2}$ turns ON switch 138 to make voltage $V_{D-OFF}$ 0V. Accordingly, voltage $V_{D-OFF}$ has a triangular waveform, and voltage $V_{REC}$ on sampling capacitor CSP records a peak of the triangular waveform. Voltage $V_{REC}$ equivalently records the length of a previous SR OFF time $T_{SR-OFF}$. As shown in FIG. 8, voltage-dividing resistors R1 and R2 connected in series divide voltage $V_{REC}$ to generate voltage $V_{RAT}$. The example in FIG. 8 shows that voltage $V_{RAT}$ is half voltage $V_{REC}$.

Within selector 134, comparator 140 compares voltage $V_{RAT}$ and voltage $V_{D-OFF}$ to generate signal SAV within a SR OFF time $T_{SR-OFF}$. Safe period $T_{SAV}$ refers to the period when signal SAV is "1" in logic in FIGS. 7 and 8. Accordingly, the length of safe period $T_{SAV}$, the time when charging path PTH in FIG. 3 could be provided, is in proportion to the previous SR OFF time $T_{SR-OFF}$ in the last switch cycle. For example, the length of safe period $T_{SAV}$ in SR OFF time SR-OFF2 is about half the length of SR OFF time SR-OFF1.

Conventionally, the energy that supports channel signal $V_D$ to resonate just dissipates over time, consumed by the parasitic resistance in a LC resonance tank. Nevertheless, a power supply according to the invention utilizes the same energy to timely charge an operation power source that supplies power to an SR controller, so the voltage level of the operation power source can be maintained. It can be expected that a power supply according to the invention could have better power conversion efficiency, since it reuses the power that was supposed to be wasted in the prior art.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method for charging an operation power source capable of supplying power to a synchronous rectifier controller, the control method comprising:
    controlling a synchronous rectifier in response to a channel signal of the synchronous rectifier to generate SR ON times and SR OFF times;
    providing an oscillation record in response to whether the channel signal resonates within a first SR OFF time; and
    directing, in response to the oscillation record, a portion of resonance energy to charge the operation power source within a second SR OFF time after the first SR OFF time, wherein the resonance energy causes the channel signal resonating.

2. The control method as claimed in claim 1, further comprising:
    detecting a length of the first SR OFF time;
    determining a safe period within the second SR OFF time in response to the length; and
    directing the resonance energy to charge the operation power source in the safe period.

3. The control method as claimed in claim 2, wherein the safe period has a length in portion to the length of the first SR OFF time.

4. The control method as claimed in claim 1, comprising:
   detecting whether the channel signal passes across a predetermined voltage several times, so as to determine whether the channel signal resonates.

5. A synchronous rectifier controller capable of being supplied power by an operation power source, for controlling a synchronous rectifier, the synchronous rectifier controller comprising:
   a switch controller turning ON and OFF the synchronous rectifier in response to a channel signal of the synchronous rectifier to generate SR ON times and SR OFF times;
   a charging switch for providing a charging path when turned ON;
   a resonance detector detecting whether the channel signal resonates within a first SR OFF time to provide an oscillation record; and
   a charging controller for, in response to the oscillation record, turning ON the charging switch in a second SR OFF time after the first SR OFF time, so that a portion of resonance energy that causes the channel signal resonating is directed to charge the operation power source through the charging path.

6. The synchronous rectifier controller as claimed in claim 5, wherein the resonance detector detects whether the channel signal passes across a predetermined voltage several times to determine the oscillation record.

7. The synchronous rectifier controller as claimed in claim 6, wherein the resonance detector detects whether the channel signal passes across the predetermined voltage twice to determine the oscillation record.

8. The synchronous rectifier controller as claimed in claim 5, wherein the charging controller comprises:
   a time recorder, recording a length of the first SR OFF time; and
   a selector, determining a safe period in the second SR OFF time in response to the length of the first SR OFF time;
   wherein the charging switch is turned on in the safe period.

9. The synchronous rectifier controller as claimed in claim 8, wherein the safe period starts at the beginning of the second SR OFF time, and has a length in proportion to the length of the first SR OFF time.

10. The synchronous rectifier controller as claimed in claim 5, wherein the switch controller turns ON the synchronous rectifier to generate the SR ON times when the channel signal has a first polarity in comparison with a reference voltage, and turns OFF the synchronous rectifier to generate the SR OFF times when the channel signal has a second polarity opposite to the first polarity in comparison with the reference voltage.

* * * * *